Figure 5:
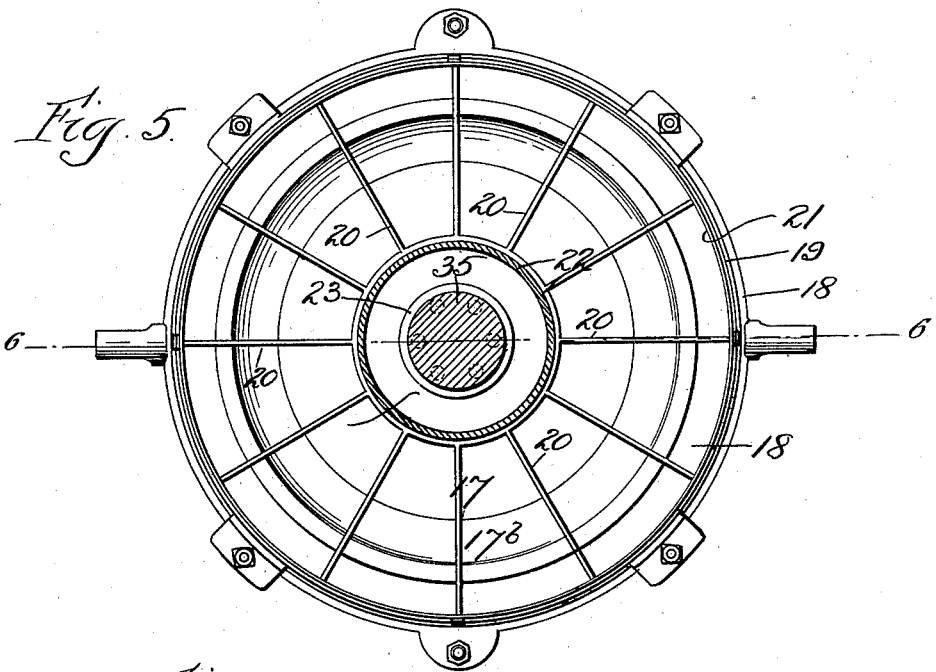

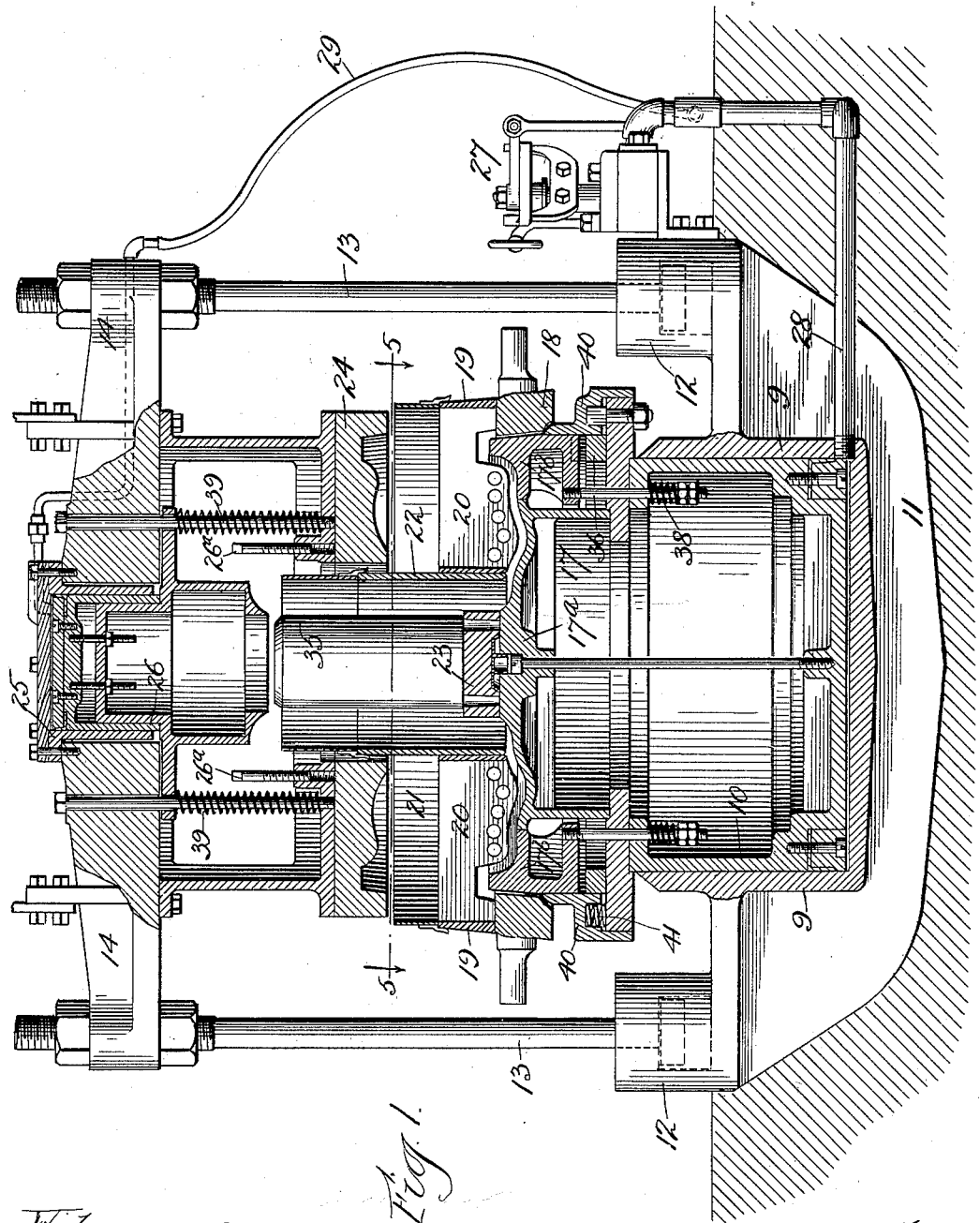

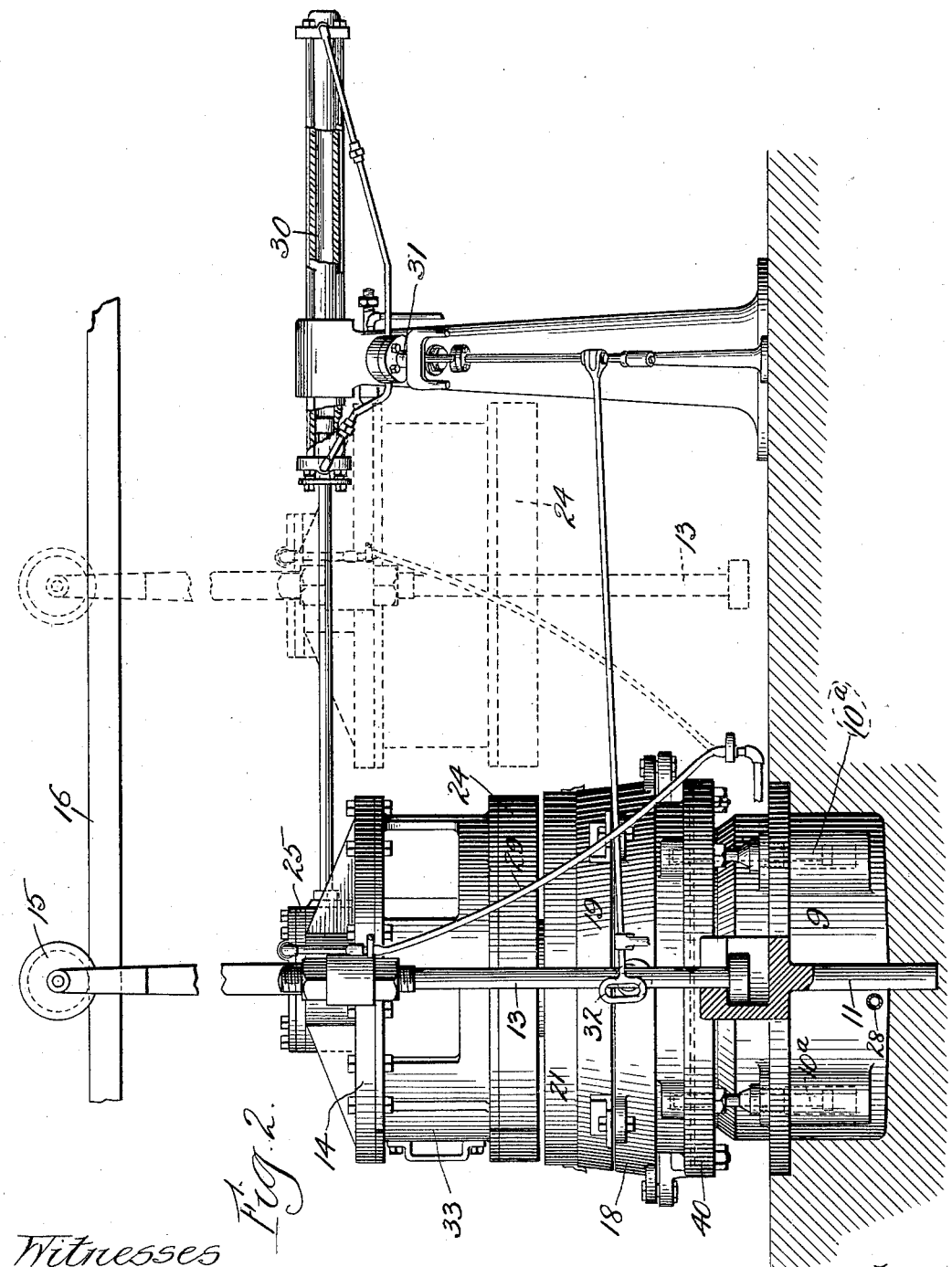

No. 612,802. Patented Oct. 18, 1898.
W. W. DOOLITTLE.
MOLDING MACHINERY.
(Application filed Oct. 11, 1897.)
(No Model.) 4 Sheets—Sheet 3.
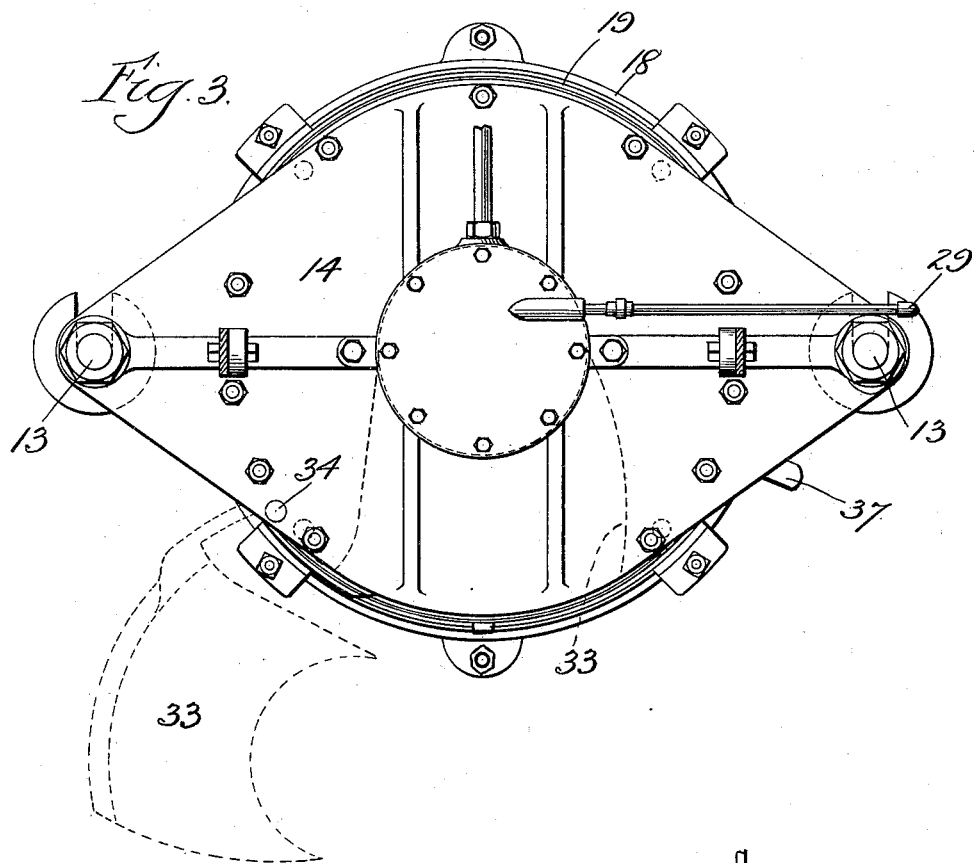
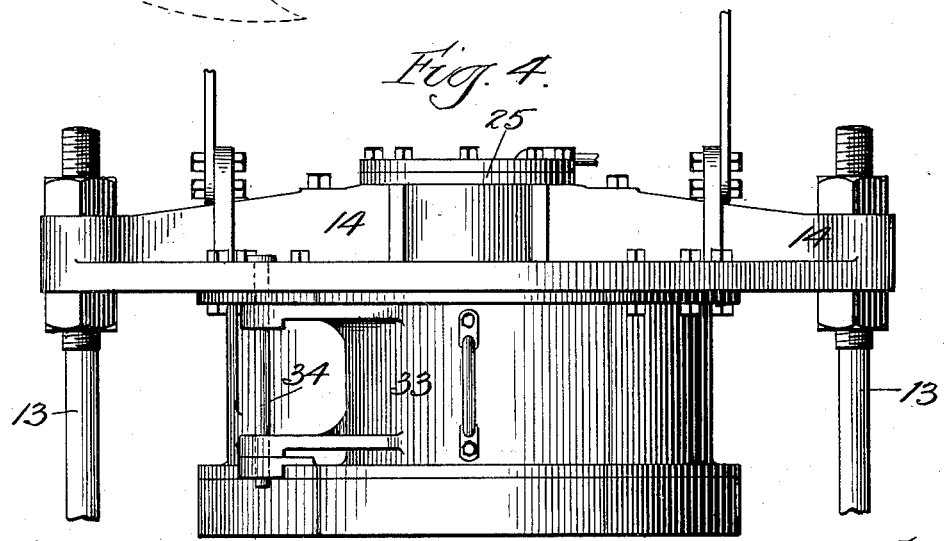
Witnesses
Wm. F. Hanning
Wm. N. Rheem
Inventor
William W. Doolittle
by Paul Synnestvedt Atty.

No. 612,802. Patented Oct. 18, 1898.
W. W. DOOLITTLE.
MOLDING MACHINERY.
(Application filed Oct. 11, 1897.)
(No Model.) 4 Sheets—Sheet 4.

Witnesses
Wm. F. Henning
Wm. N. Rheem.

Inventor
William W. Doolittle
by Paul Synnestvedt Atty.

THE NORRIS PETERS CO., PHOTO-LITHO., WASHINGTON, D. C.

UNITED STATES PATENT OFFICE.

WILLIAM W. DOOLITTLE, OF CHICAGO, ILLINOIS, ASSIGNOR TO THE GRIFFIN WHEEL COMPANY, OF SAME PLACE.

MOLDING MACHINERY.

SPECIFICATION forming part of Letters Patent No. 612,802, dated October 18, 1898.

Application filed October 11, 1897. Serial No. 654,792. (No model.)

*To all whom it may concern:*

Be it known that I, WILLIAM W. DOOLITTLE, a citizen of the United States, residing in Chicago, in the county of Cook and State of Illinois, have invented certain new and useful Improvements in Molding Machinery, of which the following, taken in connection with the accompanying drawings, is a specification.

The first of the objects of my present invention is to effect a saving in the cost of operation of machines of the above-mentioned class by reducing the power required in such operation. To this end I construct a molding-machine having two compressing-cylinders, one large one for doing the main portion of the work, arranged preferably beneath the mold, and one small one arranged to act in opposition to the first one to assist in the compression of the sand in the runner-box, which is of greater depth than that of the balance of the mold. By this arrangement I am enabled to materially reduce the requisite stroke of the larger ram, and thus also the quantity of power fluid used in operating the same. In order to still further shorten the requisite travel of the main ram and yet permit the platen to be drawn back out of the way of the runner-box and gate-plug, I construct the rammer-head carried by the platen with its front portion removable, preferably hinged, so as to swing out of the way. This avoids the necessity of lowering the ram and mold to an extreme distance in order to clear the under side of the rammer-head.

A further improvement in this machine has reference to a platen suspended by rollers upon an overhead track having power mechanism for moving the same and strain-rods secured to the platen in position to engage the main portion or body of the machine during the act of compression.

Another improvement which I have introduced in this machine has relation to the provision of means for compressing the sand which is under the bars of the cope. This is accomplished by the introduction of mechanism whereby that portion of the machine which supports the flask is permitted to yield slightly during the movement of the compressing-ram.

In order to facilitate the stripping of the pattern from the mold, I make the pattern in parts or sections, one or more of which can be separated from the mold before the others and the outline of the mold better held in its proper form.

I will now proceed to describe my invention in connection with the accompanying drawings, in which—

Figure 6:
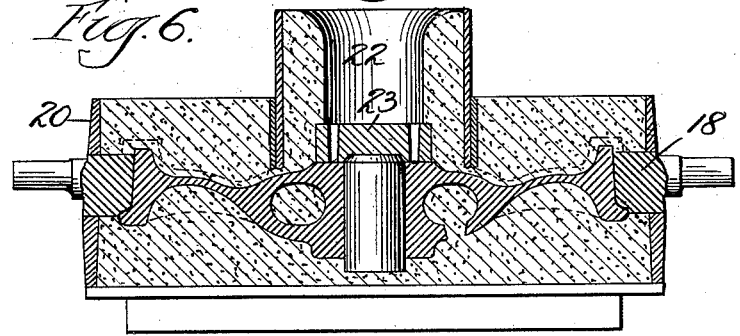
Figure 7:
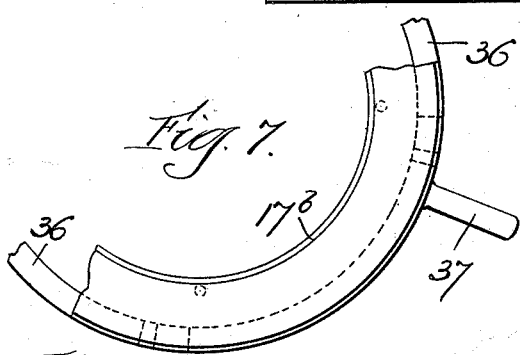
Figure 8:
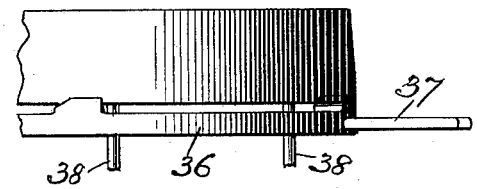

Figure 1 is a vertical section through the center of a molding-machine embodying my improvements. Fig. 2 is an end view of the same. Fig. 3 is a plan view of the platen. Fig. 4 is a front elevation of the same. Fig. 5 is a plan view of the cope after it has been completed. Fig. 6 is a section of the completed mold, taken on the line 6 6 of Fig. 5. Fig. 7 is a detail of the device for lowering the outer portion of the pattern, and Fig. 8 is a view showing the device employed to hold the outer portion of the pattern up into position for compressing the mold.

Referring now more particularly to Fig. 1, it will be seen that my invention comprises a main cylinder 9, having a ram 10 operating therein, and a projecting rib 11, which at each side of the cylinder is provided with sockets 12, adapted to receive the ends of the strain-bars 13, which are secured to a platen 14, that is suspended by rollers 15 upon an overhead track 16.

To the ram 10 is secured a pattern 17, this being made in two parts $17^a$ $17^b$, the outer of which is surrounded by a chiller 18 of the usual form. Above the pattern is placed a flask 19, provided with a plurality of bars 20 for holding the sand in place, and over the flask is arranged a sand-box 21, such as is commonly employed. In the middle of the flask 19 is a runner-box 22, containing a core 23, having a series of gates therein. To the platen is secured the rammer-head 24 and also the air-cylinder 25 and its operating-ram 26. Leading from the valve 27 is a pipe 28, which goes to the main cylinder 9, a pipe 29 leading from pipe 28 and by flexible connection communicating with the cylinder 25.

I will now proceed to describe my improved machine as applied to the manufacture of the cope portion of a car-wheel mold. The parts first being in the position shown in Fig. 1, the platen 14 is drawn back out of the way to the position shown by dotted lines in Fig.

2 by means of an air-cylinder 30, operated by a valve 31 and connected handle 32. In order to permit this backward movement of the platen and the connected parts without interfering with the portions of the cope which rest upon the main ram and to enable the latter to be operated with as short a stroke as possible, I provide the rammer-head with an openable section or hinged portion 33, pivoted at 34, so as to swing out of the way into the position shown in Fig. 3. The flask and sand-boxes being in position, the core 23 is now placed upon the pattern with the plug 35 immediately over it. The flask, sand-box, and runner-box are now filled with sand and the platen and rammer-head are brought forward immediately over the mold, the hinged part 33 being swung into place, and the valve 27 is turned to admit pressure to operate the ram 10 and also the ram 26, compressing the sand in the flask and that in the runner-box at the same time, the extent of compression of the two rams, respectively, being limited by the stop-bolts 10ª, Fig. 2, and 26ª, Fig. 1. In order to properly compress the sand under the sand-retaining bars of the flask, the ring 40, which, with the chiller 18, serves to support the flask in position, is provided on its under face with a number of recesses in which are springs 41, the whole being constructed to yield slightly during the act of compression. This is permitted by reason of the fact that the pressure exerted upon the chiller from the support upon which it rests is transmitted through the springs 41, and the part of the pattern marked 17ᵇ does not fit within the chiller-ring so tightly but that a small amount of movement of the chiller-ring in opposition to the springs 41 can be secured. There being sand between the sand-retaining bars and the pattern when the act of compression commences, the slight movement of the chiller and supporting part 40 permits the sand under the bars to be compressed. The air being now exhausted, the ram 10 descends and the ram 26 is raised by means of the springs 39, and the hinged portion 33 being opened the platen is moved back out of the way by the power-cylinder 30, and the sand-boxes and plug are then removed. The wedge-ring 36 is now turned by means of the handle 37, (see Figs. 7 and 8,) so as to permit the outer portion of the pattern 17 to fall away from the mold, the springs 38 assisting in this downward movement, and the central portion of the pattern 17ª helping to support the mold and prevent it from being injured during the operation. The cope and chiller are now lifted off in the usual way.

Having thus described my invention, what I claim as new, and desire to secure by Letters Patent, is—

1. In a molding-machine, the combination with a compressing mechanism, a pattern-plate carried thereby, a flask carried by said pattern-plate, and a runner-box, of a laterally-movable platen, a rammer-head carried by said platen, having a central opening to receive the runner-box, and an openable section upon one side of said central opening whereby said platen and rammer-head may be withdrawn from operative position, substantially as described.

2. In a molding-machine, the combination with a compressing mechanism, a pattern-plate carried thereby, a flask carried by said pattern-plate, and a runner-box, of a laterally-movable platen, a rammer-head carried by said platen, having a central opening to receive the runner-box, and a hinged portion upon one side of said central opening whereby said platen and rammer-head may be withdrawn from operative position, substantially as described.

3. In a molding-machine, the combination with a flask having a runner-box for forming the gate and being of greater depth than the flask, and compressing mechanism for acting upon the contents of the flask, of a platen-head against which compression is effected and having an opening through which said runner-box extends, and compression mechanism above the runner-box for compressing the sand therein, substantially as described.

4. A molding-machine comprising the combination of a frame, a movable platen, an overhead track independent of said frame, devices whereby said platen is supported upon said track, depending strain-rods hanging from said platen, and having detachable connection with said frame, mechanism whereby the strain-rods may be adjusted independently of the platen-supporting devices, and means for moving said platen into and out of operative position, substantially as described.

WILLIAM W. DOOLITTLE.

Witnesses:
PAUL SYNNESTVEDT,
LOUIS K. GILLSON.